June 20, 1961
B. G. PRICE ET AL
2,989,692
PIPE INSPECTION APPARATUS
Filed Oct. 27, 1958
7 Sheets-Sheet 1
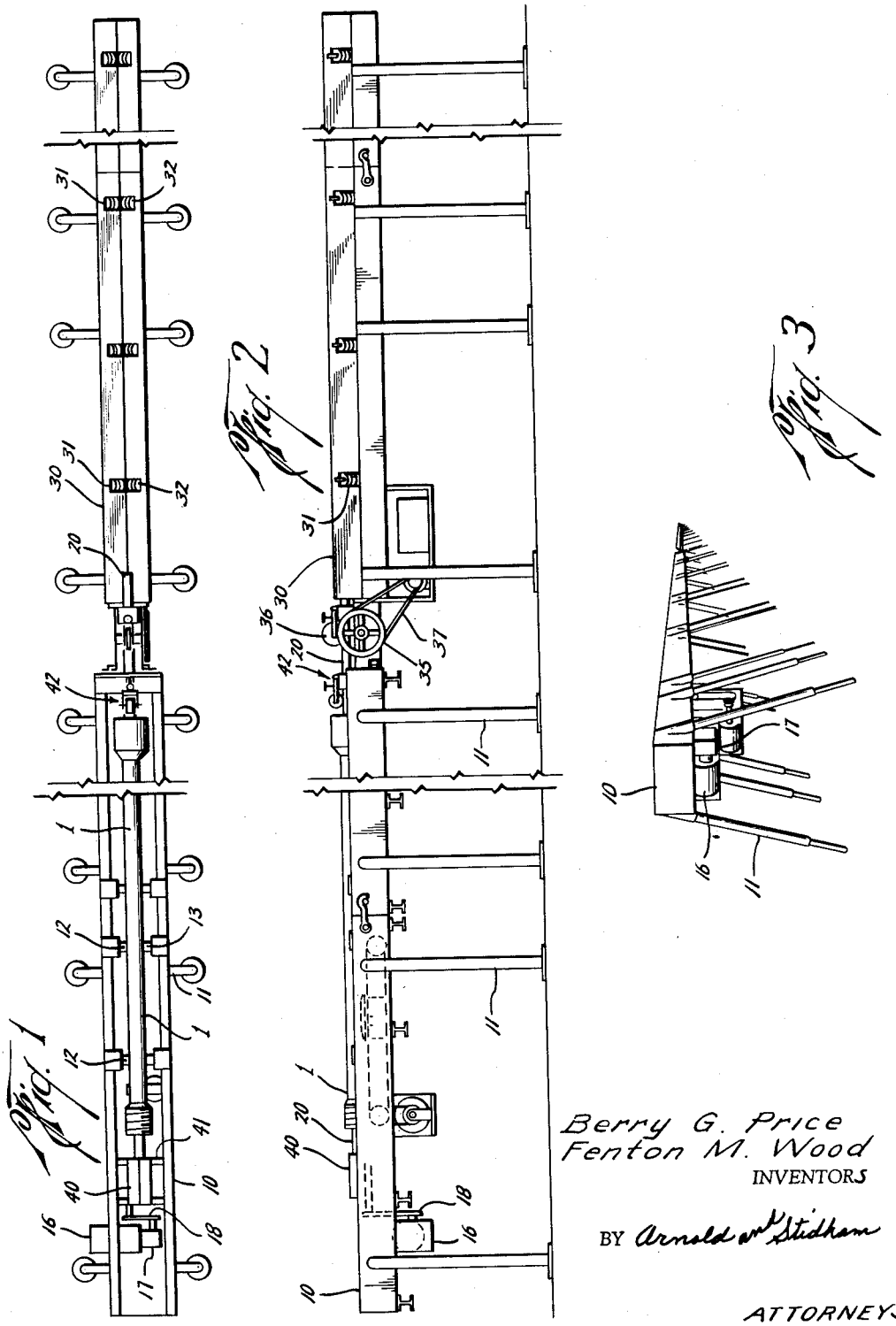
Berry G. Price
Fenton M. Wood
INVENTORS
BY Arnold M. Stidham
ATTORNEYS

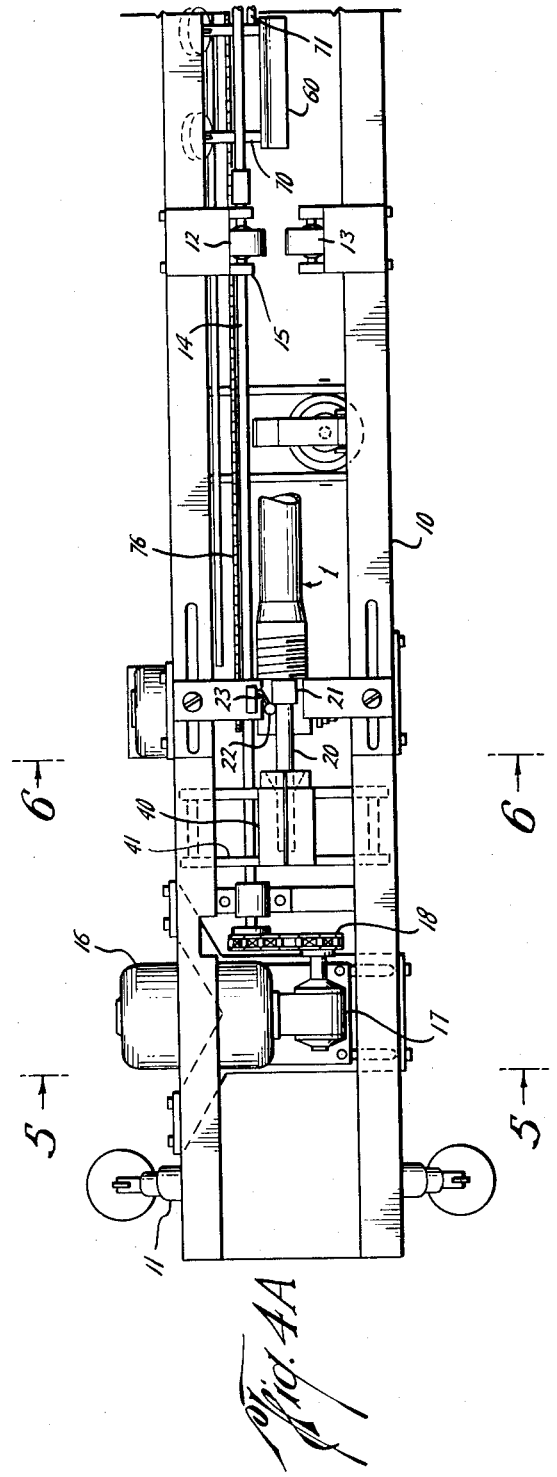

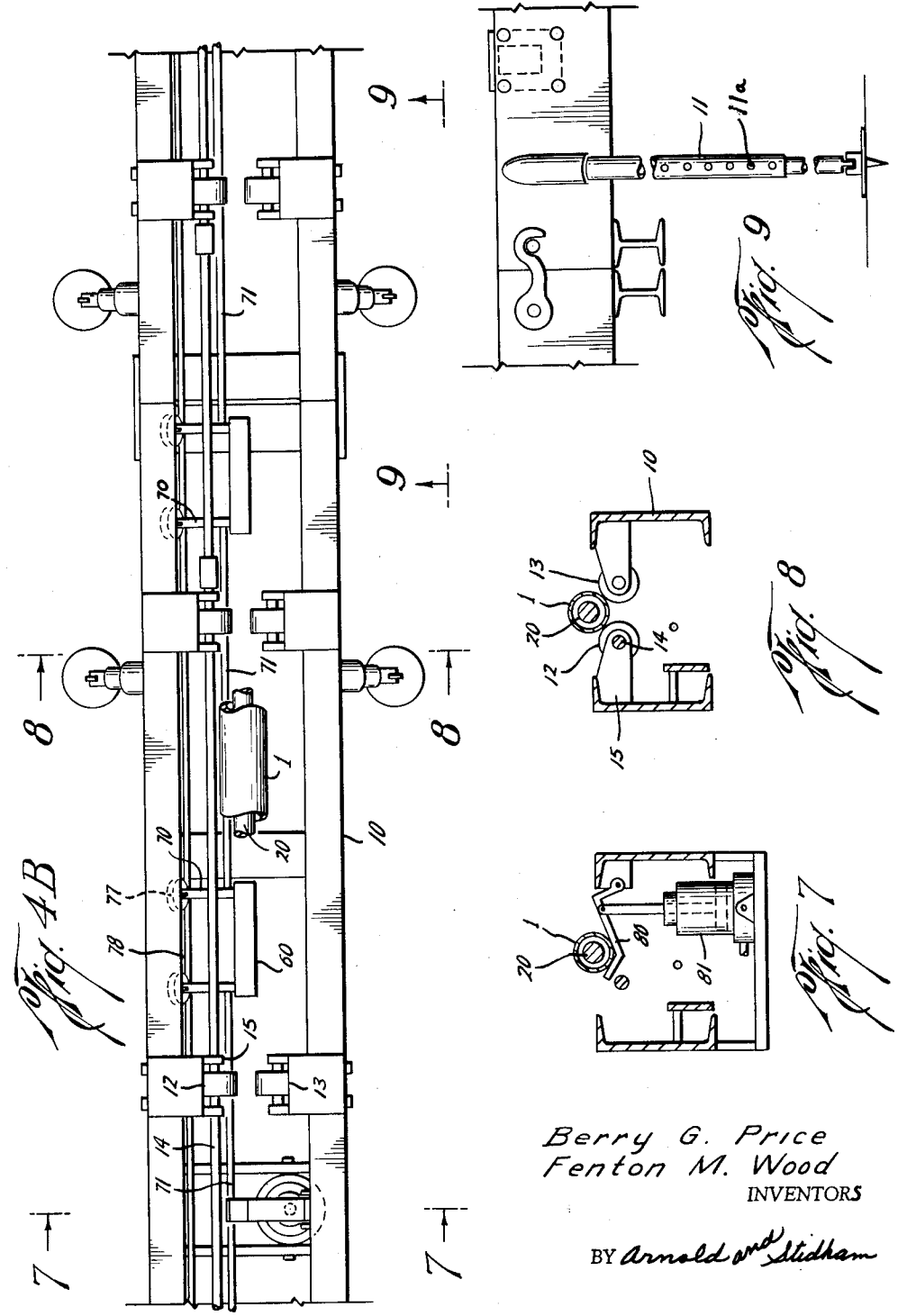

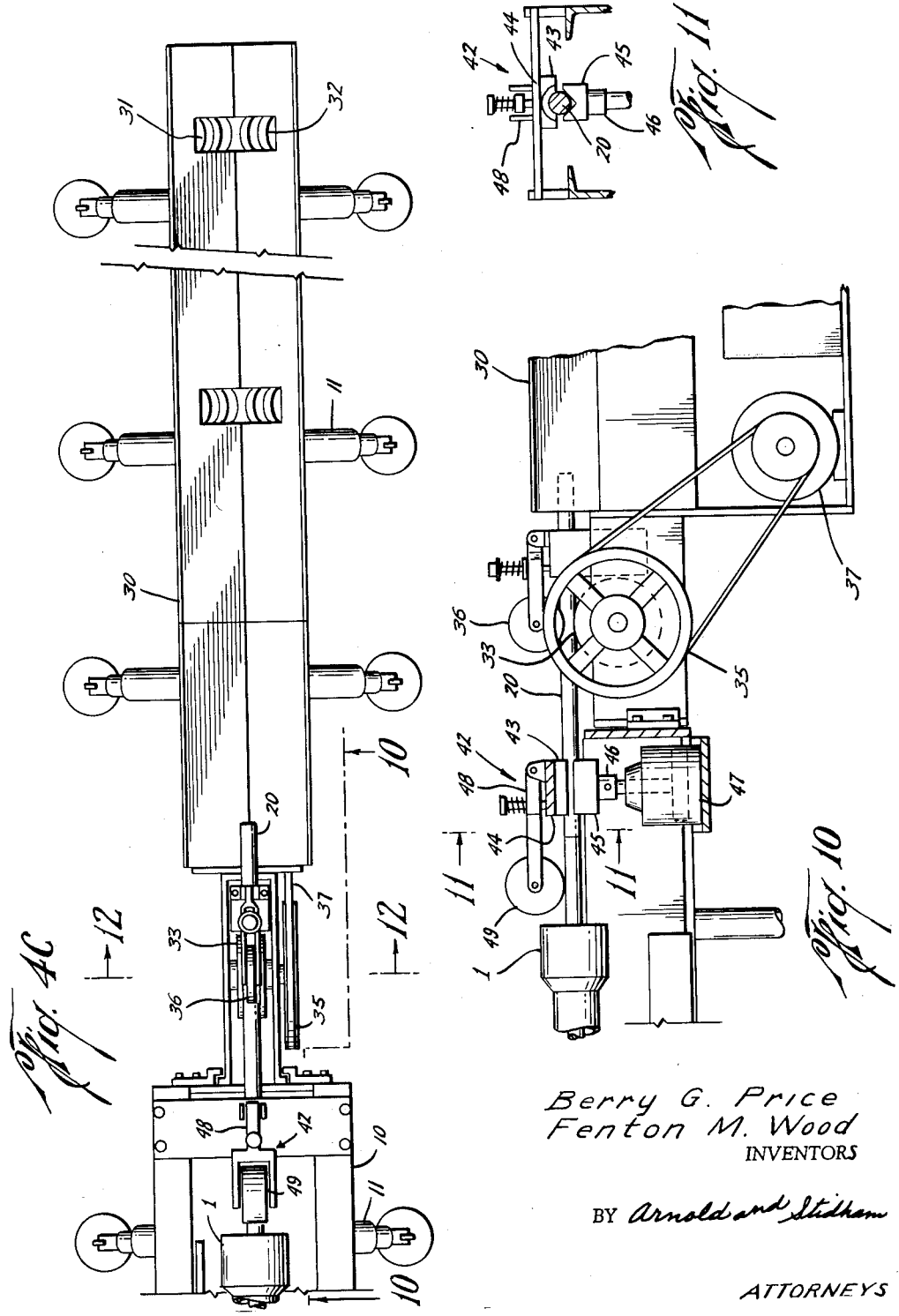

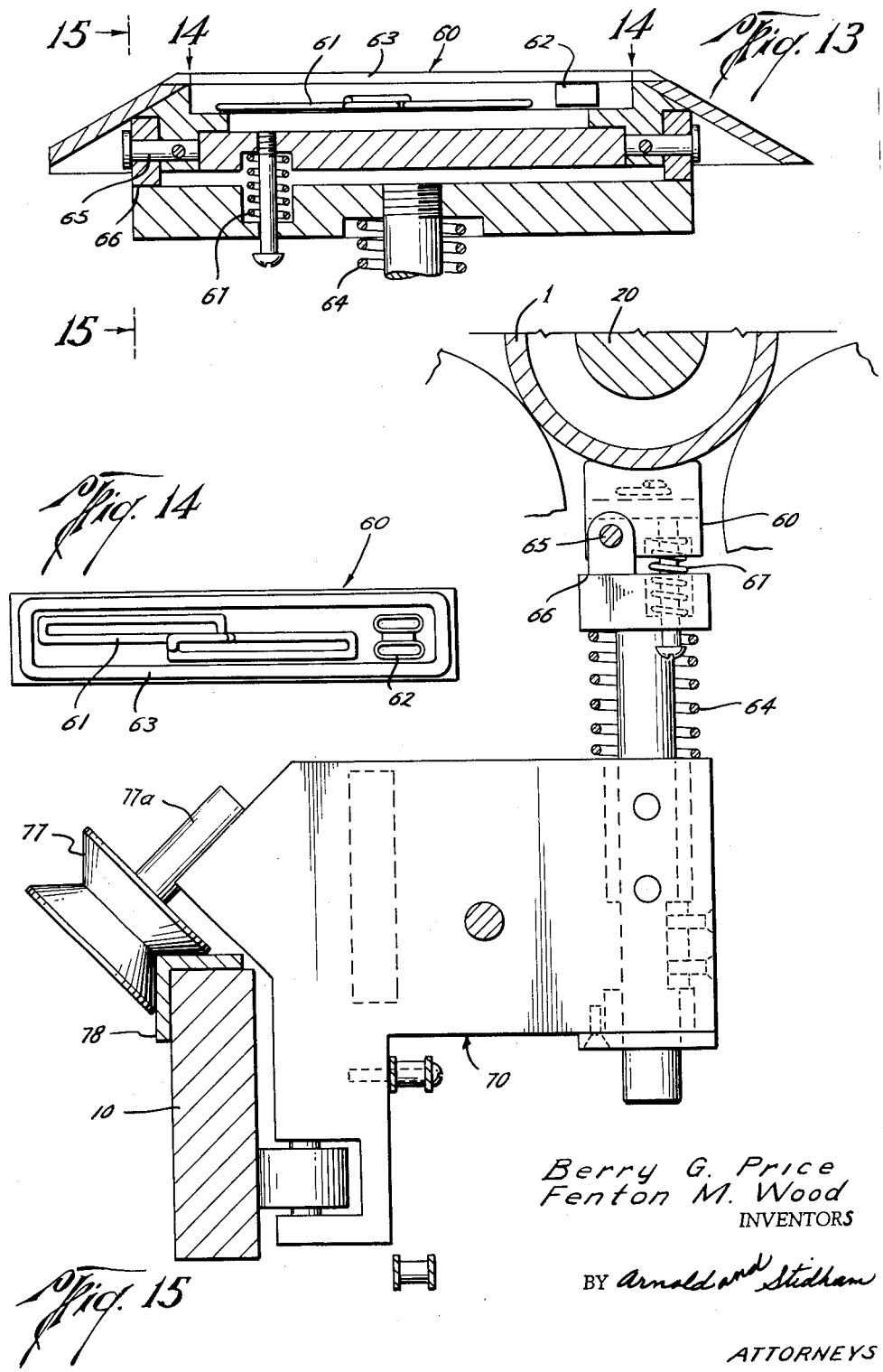

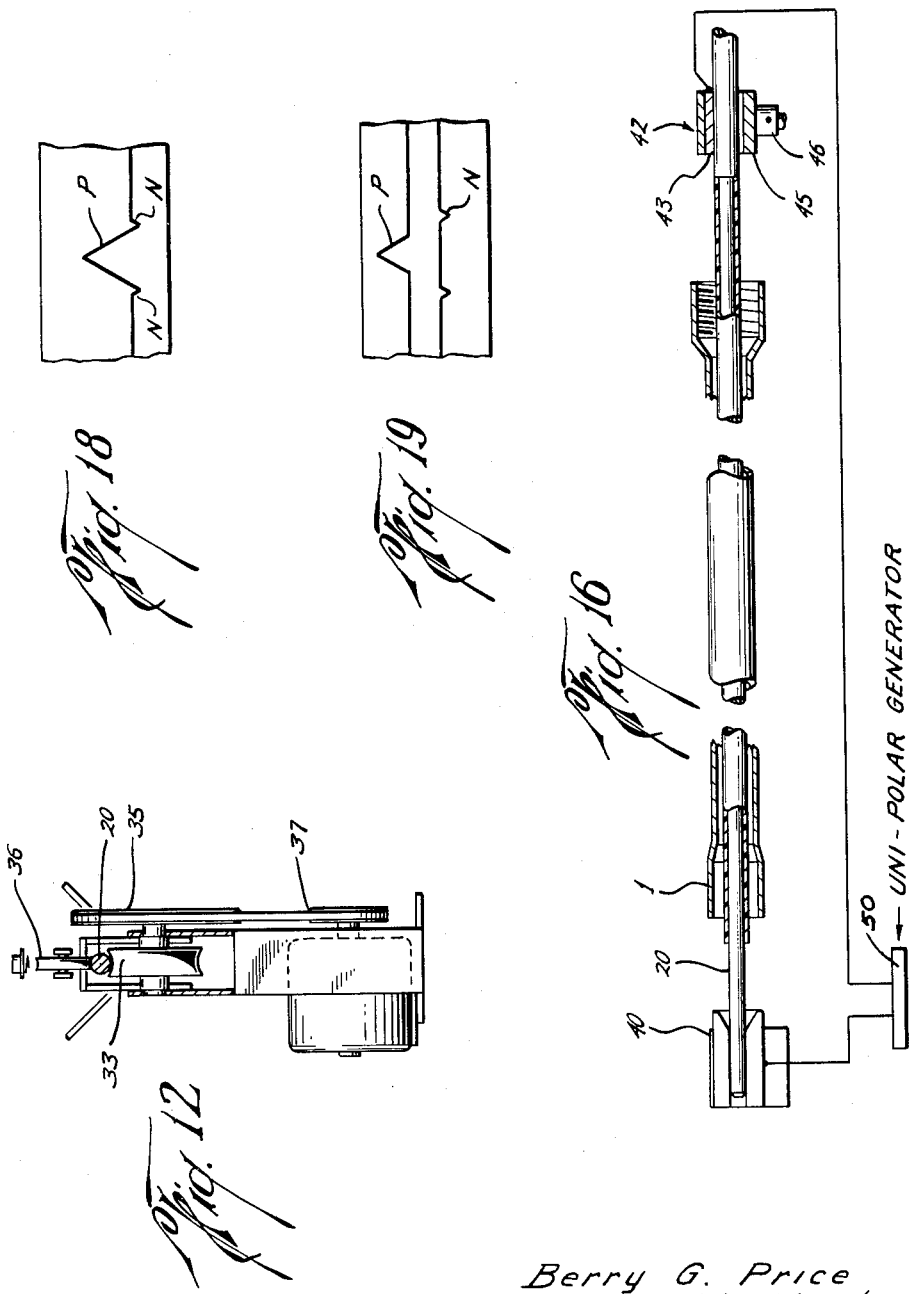

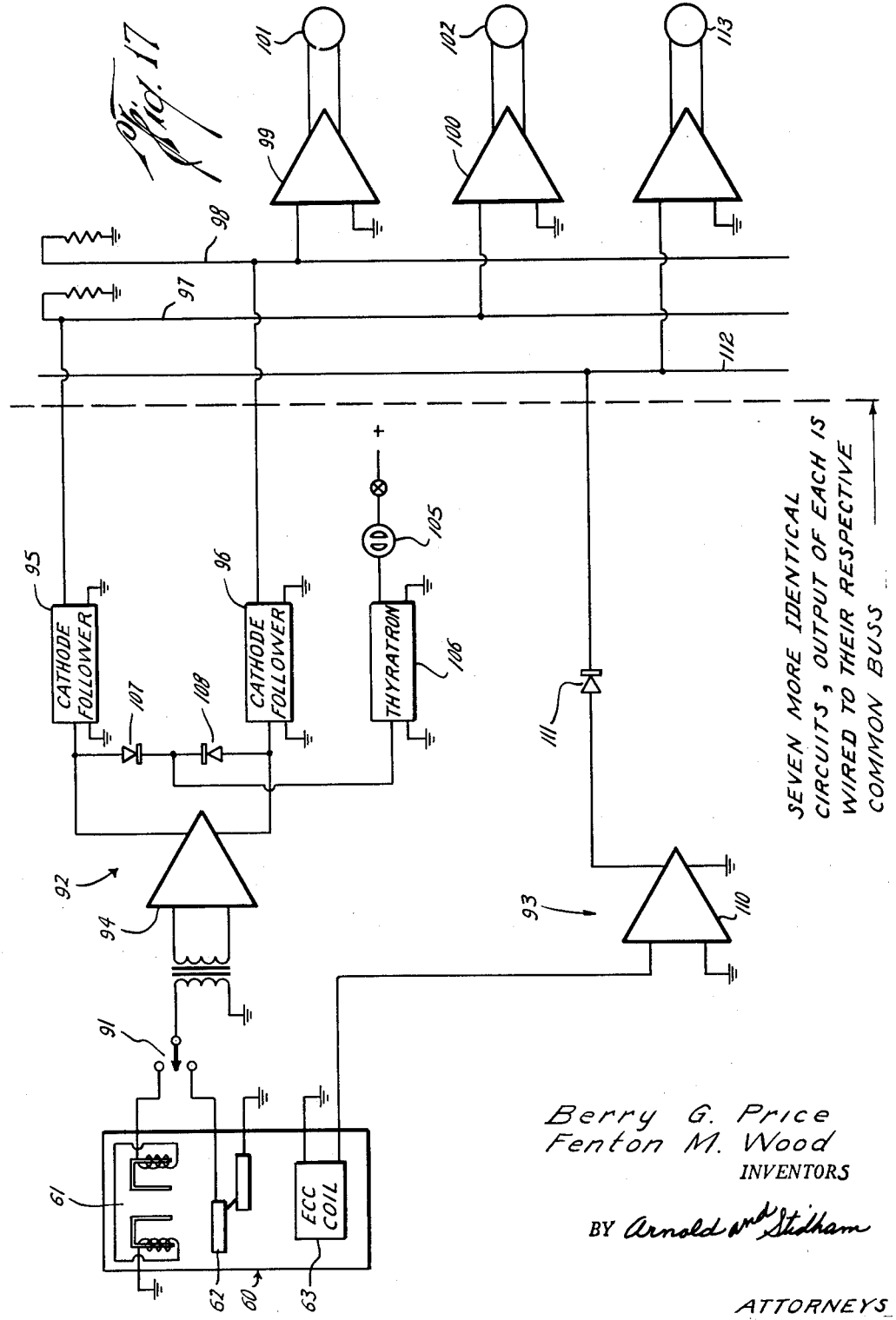

United States Patent Office 2,989,692
Patented June 20, 1961

2,989,692
PIPE INSPECTION APPARATUS
Berry G. Price and Fenton M. Wood, both of
P.O. Box 808, Houston, Tex.
Filed Oct. 27, 1958, Ser. No. 769,783
6 Claims. (Cl. 324—37)

This invention relates to pipe inspection methods and apparatus and, more particularly, to methods and apparatus for pipe inspection involving the application of magnetization and the detection of deviations from an ideal pattern of magnetic flux.

The detection of flaws in drilling pipe, casing and the like has long been recognized in the oil industry as being of tremendous importance in preventing the development of critically weak areas that may produce rupture and separation of pipe or casing while in place in a well with resultant damage to the well and/or interference with drilling operations. Moreover, the recovery operation necessary to retrieve pipe which has parted due to flaws is in itself quite expensive and time consuming.

Many and various devices have been employed for the detection of flaws but all have been lacking in efficiency and accuracy. For example, one method previously used involved the indentation of a pipe with a plunger to gain an indication of its yield strength. This method is obviously very inaccurate and inconclusive because of the difficulty of covering the pipe surface sufficiently to detect flaws of limited area. Another method involved the use of a strength test machine to stretch the pipe and thus determine its yield strength. Again, this method gives no indication as to potentially dangerous cracks, pits or laps of limited area.

Inductive electro-magnetic pipe inspection is more accurate than the other methods since it permits complete scanning of a specimen without damage thereto giving an indication of both location and magnitude of flaws.

In such systems however, a flux pattern produced by a deviation from concentricity of the inner and outer surfaces includes no sharp or pronounced flux patterns, and it often passes undetected.

It is, therefore, an object of this invention to provide an apparatus for non-destructive inspection of tubular members having an improved flux pattern sensing means.

It is a further object of this invention to provide a detector device capable of determining any eccentricity between the inner and outer surfaces of a tubular member.

Yet another object of this invention is to provide a new method of magnetizing pipe whereby even minute flaws in the tubular member can be detected.

In carrying out our invention, the casing or other tubular member to be inspected is placed on a supporting rack. A rod made of a conductor of electricity is then inserted into the tubular member and energized by a high level no drift constant electric current which is supplied by a uni-polar generator. The flux, thus created, is inspected on the outside of the tubular member by a plurality of flux responsive detector heads which move in a path parallel to that of the axis of the tubular member while the tubular member is rotated. The intelligence signal derived from each detector head not only yields an indication as to the presence of flaws and their magnitude but also gives an indication as to any eccentricity present in the tubular member, i.e. any deviation from concentricity of the inner and outer surfaces. All of the flaw signals are then fed into a maximum selector circuit which passes only the maximum eccentricity signal to the recording means. Likewise all of the eccentricity signals are fed into a maximum selector circuit which passes only the maximum eccentricity signal to the recording means.

Other objects and advantages of this invention will become apparent from the specification following when read in view of the accompanying drawings wherein:

FIG. 1 is a top view of the pipe inspection apparatus comprising our invention;
FIG. 2 is a side view of our apparatus;
FIG. 3 is an isometric view of our apparatus;
FIGS. 4a, 4b and 4c comprise a detailed top view of our apparatus;
FIG. 5 is a section view along line 5—5 of FIG. 4a;
FIG. 6 is a section view along line 6—6 of FIG. 4a;
FIG. 7 is a section view along line 7—7 of FIG. 4b;
FIG. 8 is a section view along line 8—8 of FIG. 4b;
FIG. 9 is a detail view along line 9—9 of FIG. 4b;
FIG. 10 is a detail view taken along line 10—10 of FIG. 4c;
FIG. 11 is a detail view taken along line 11—11 of FIG. 10;
FIG. 12 is a section view taken along line 12—12 of FIG. 4c;
FIG. 13 is a side view in section of the flux responsive detector head forming a part of our invention;
FIG. 14 is a detail view taken along line 14—14 of FIG. 13;
FIG. 15 is a section view taken along line 15—15 of FIG. 13;
FIG. 16 is a schematic wiring diagram for the magnetizing assembly of our invention;
FIG. 17 is a schematic wiring diagram for the detecting assembly of our invention; and
FIGS. 18 and 19 are schematic graphical illustrations of signals induced by a detector head.

Referring now to the drawings, and particularly FIGS. 1 to 4, a pipe or similar tubular member 1 to be inspected is placed on the supporting rack 10 which is mounted on legs 11. To adjust the height of the rack 10 or to enable its use in the field in rough terrain the legs are provided with height and level adjusting spring detent holes 11a or the like (FIG. 9). The pipe 1 being inspected is supported directly by and between horizontal rollers 12 and 13 mounted on the rack 10 to rotate about axes parallel to the axis of the pipe 1, as shown in FIG. 8. Preferably, as shown in FIG. 4a, one set of rollers 12 is keyed to an elongate shaft 14 journaled in a series of bearing brackets 15 secured to the supporting table or rack 10 so that rotation of the shaft by means of a motor 16, reduction gear 17 and chain and sprocket drive 18, will rotate all of the rollers 12 in unison. The frictional engagement between the pipe 1 and rollers 12 will produce rotation of the pipe therewith, the rollers 13 also rotating in the nature of idlers.

As shown in FIG. 4c, a rod 20 made of a conductor of electricity is supported along its length by a series of transverse rollers 31, 32 to facilitate axial movement thereof, the rod being moved selectively in either axial direction by drive wheel 33 (FIG. 10) of neoprene or the like journaled on rod supporter rack 30. The drive wheel 33, which is in frictional engagement with the current carrying rod, is rotated by means of a belt and pulley 35 or similar power transmission device driven by reversible motor 37. Slippage between the drive wheel 33 and current carrying rod 20 is minimized by the use of a spring loaded idler roller 36 which presses down on the current carrying rod 20 thus forcing it into firmer engagement with the drive wheel 33 and, hence, increasing driving efficiency.

When the rod 20 is at its extended position, projecting through the drill pipe 1, as shown in FIGS. 1 and 4, it is received and supported at its free forward end in a cylindrical bore in a forward electrical contact switch housing 40 which is supported on the rack 10 by brackets or arms 41. An electrical circuit is completed through the rod 20 from a source to be hereinafter described, by means of the front contact switch and a back electrical contact switch 42 which includes an upper contact member 43 rigidly supported on the rack 10 by means of a plate 44 and a lower pressure and support member 45 carried on the rod 46 of a pneumatic piston 47 also mounted on the rack 10 (FIGS. 4c, 10 and 11). A spring loaded arm 48 and roller assembly 49 is mounted on the plate 44 to exert downward pressure against the rod 20 so that contact between the upper contact member 43 and the rod 20 is broken whenever the lower support member 45 is withdrawn by the air piston 47.

When the rod 20 reaches its most forward position, as shown in FIG. 4a, a flange or collar 21 on the rod 20 operates a contact switch 22 supported by arm 23 secured to the rack 10. Operation of the contact switch 22 interrupts the power supplied to the rod inserter motor 37 and causes air piston 47 to operate, thereby causing a gripping action to be applied to the rod 20 by the lower support member 45 of the contact switch pressing against the rod 20. A high level no ripple constant direct current is then supplied to the rod 20 through the front electrical contacts 40 and rear electrical contact 42 by a uni-polar generator 50, as shown schematically in FIG. 16. A uni-polar generator 50 was used since a current as high as 4,500 amps. is sometimes needed.

Referring now to FIGS. 13, 14 and 15, each of the flux responsive detector heads 60 contains a pair of identical search coils of the air core type 61 which are long and narrow and which are wired in series opposition to each other. The pair of air core type identical coils 61 is responsive not only to narrow patterns of flux produced by defects in the external surface of the pipe, but also to large flux patterns produced by defects in the external surface. Thus, the search coils 61 will detect the existence and location of any flow whether it be on the inside or outside of a pipe 1. Adjacent the first pair of search coils is a pair of identical measuring coils of the iron core type 62 which are shorter and narrower than the first pair and also wired in series opposition to each other. This smaller pair of iron core type coils 62 is responsive only to narrow flux patterns such as are created by the presence of flaws on the external surface of the tubular member 1. Thus, with the two coils simultaneously scanning the outer surface of a pipe, there will be an indication of not only the position and magnitude of a flaw but also of its location on either the inner or the outer surface of the pipe 1, dependent upon whether both pair of coils or only the large pair of coils respond to flux variation.

Both pair of coils 61 and 62 are enclosed within a long and wide air core type coil 63 which is responsive only to very broad patterns of flux such as are caused by gradual changes in wall thickness as where the inner and outer surfaces of the pipe are not concentric.

In actual practice only the search coils 61 and eccentricity coils 63 are in continuous use. When the operator discovers a flaw which needs evaluating, he stops the travel of the detector heads 60 and switches over to the measuring coils 62. Only if the measuring coils 62 are responsive, is the flaw on the outside. In this manner he obtains the correlation between inside and outside flaws and identifies them separately.

Each detector head is mounted on a carriage 70 moveable along the rack 10, the length of stroke being, of course, dependent upon the number of detector heads employed. Preferably, only one detector head carriage 70 is power-driven. All the other detector head carriages are tied to the power detector head carriage 70 by connecting rods 71 shown in FIG. 4a. Therefore, when the powered detector head carriage 70 moves, a concomitant movement is imparted to the remaining detector head carriages. With the pipe 1 rotating while the detector heads move longitudinally along the pipe, it is apparent that each detector head traverses the surface of the pipe in a helical path.

As shown in FIG. 6, a reversible motor 72 with a belt drive 73 drives the sprocket shaft 74 and sprocket 75. A longitudinally extending endless chain 76 (FIG. 4) driven by sprocket 75 is passed over idler sprocket (not shown) to drive the powered detector head carriage 70.

Referring now to FIGS. 4b and 15, each of the series of detector carriages 70 is mounted for movement along the pipe 1, each carriage 70 having flanged rollers 77 rotatable on stub shafts 77a fixed to and extending from the carriage 70 to guide the carriage along a track 78 carried on the rack 10 parallel to the axis of the pipe 1. On each of the carriages 70, as shown in FIG. 14, detector head 60 is pivotally mounted about pin 65 on detector head seat 66 with a compression spring 67 urging it into operative engagement with the tubular member 1. As the tubular member 1 rotates in a clockwise direction, the detector head 60 is forced against it. The leading edge of detector head 60 is spring mounted to assure even wear.

Connected to each detector head 60 is a signal monitor shown in FIG. 17. The signal from either the search coils 61 or measuring coils 62, depending upon the position of switch 91 is fed into a first signal circuit 92 and the signal from the eccentricity detector coils 63 is fed into the second signal circuit 93. The monitor is designed such that it preserves both the positive and negative components of the flaw signals. This preservation of both components is a tremendous aid in the analysis of the ultimate record. The signal generated by passage of a coil over a flaw customarily comprises a positive pulse P intermediate two negative pulses N. If both components are preserved and separately recorded as illustrated in FIG. 19 the relative disposition of the components will be maintained.

The preservation of components is accomplished by feeding signals from the search or measuring coils 61 or 62 to a push-pull voltage amplifier 94 where a portion of the signal is inverted. The signals are then fed to cathode followers 95 and 96. The cathode follower 95 passes only positive components to buss bar 97 while the cathode follower 96 passes only now positive, but originally negative components, to the buss bar 98. Similarly signals from all recorder heads 60 are fed through similar circuitry to the buss bars 97 and 98 to be amplified at 99 and 100 and recorded at galvanometers 101 and 102, respectively. Since all signals are connected to a common buss bar, only the signal of greatest magnitude representative of the most critical flaw detected by any recorder head 60 will be recorded. In addition we provide for the indication of any recorder head 60 from which a signal of flaw detecting intensity is generated. At each recorder head 60 a neon lamp or the like 105 is energized by a thyratron tube 106 each time a positive signal of predetermined intensity representative of a flaw is passed by rectifiers 107 or 108. Thus, our monitor system records the location and depth of the deepest flaw and also indicates the detection of any flaw.

The signal from the eccentricity detector coil 63 is passed into the second signal circuit 93 of the monitor where it is amplified at 110 and rectified at 111 before being fed into a buss bar 112 which accumulates all signals for recordation at the recorder 113.

After the complete inspection of tubular member 1, the current carrying rod 20 is withdrawn onto rod support rack 30 and the tubular member 1 is flipped off of the inspection rack 10 by arms 80 (FIG. 7) which are pivotally mounted on the rack 10 and which are actuated by an air piston 81 which also is mounted on the rack 10.

For effective pipe inspection, it is not necessary that the scanning devices 60 be passed over the tubular member 1. Instead, the scanning devices 60 may be stationary and relative longitudinal movement between the scanning heads 60 and tubular member 1 be accomplished by mounting the drive rollers 12 and idler rollers 13 with a pitch angle relative to the axis of the pipe. Rotation of the rollers 12 and 13 would thus not only rotate the tubular member 1 but would in addition cause it to move longitudinally past the scanning heads 60.

In the preferred embodiment of our invention, the tubular member 1 to be inspected is placed on the supporting rack 10. The conductive rod 20 is inserted into the tubular member 1 and energized by high level no drift constant electric current supplied by a uni-polar generator 50. The flux, thus created, is inspected on the outside of the tubular member 1 by the series of flux responsive detector heads 60 moving along the axis of the tubular member 1 while the tubular member 1 is rotated. The intelligence signal derived from each detector head 60 not only yields an indication as to the presence of flaws and their magnitude but also gives an indication as to any eccentricity present in the tubular member 1. All of the flaw signals are then fed into the buss bars 97 and 98 which pass the maximum cumulative flaw signal to the recording device 101. Likewise, all of the eccentricity signals are fed into a maximum selector circuit 99 which passes only the maximum eccentricity signal to the recording device 110.

While one preferred embodiment of the apparatus employed in the present invention has been illustrated, it will be understood that many modifications can be made therein without departing from the spirit and scope of the appended claims.

Having described our invention, we claim:

1. In apparatus for determining flaws in tubular members including means for creating a magnetic field within said tubular member the combination therewith of a detector device for determining variations in said magnetic field comprising five scanning coils adapted to be disposed adjacent the outer surface of the tubular member and means for producing helical movement of said scanning coils along the outer surface of said tubular member, a first pair of said scanning coils being identical and being long and narrow and of the air core type, a second pair of said scanning coils being identical and being shorter and narrower than the first mentioned pair and being of the iron core type, the remaining scanning coil being longer and wider than the coils of said first mentioned pair and being of the air core type, said first pair of scanning coils being sufficiently long and wide to be responsive both to narrow patterns of flux produced by defects in the external surface of said tubular member and to broad patterns of flux variations produced by defects in the internal surface of said tubular member, said second pair of scanning coils being sufficiently short and narrow to be responsive only to narrow patterns of flux variations produced by defects in the external surface of said tubular member, said remaining scanning coil being responsive to flux variations caused by eccentricity of the tubular member.

2. In apparatus for determining flaws in tubular members including means for creating a magnetic field within said tubular member, the combination therewith of a detector device for determining variations in said magnetic field comprising a first coil means sufficiently long and wide to be responsive to variations in flux caused by defects on both the inner and outer surface of said tubular member, second coil means sufficiently short and narrow responsive only to variations in flux caused by defects on the outer surface of said tubular member, an eccentricity coil means adapted to detect variations from concentricity of the inner and outer surfaces of said tubular member, and means for producing simultaneous movement of all of said coil means along a helical path on the outer surface of said tubular member.

3. In apparatus for determining flaws in tubular members including means for creating a magnetic field within said tubular member, the combination therewith of at least two detector devices for determining variations in said magnetic field at axially spaced portions of said tubular member, each of said detector devices comprising a first coil means responsive to both broad variations in flux caused by defects on the inner surface of said tubular member and narrow variations in flux caused by defects on the outer surface of said tubular member, a second coil means responsive only to said narrow variations in flux, an eccentricity coil of the air core type larger than either of the above-mentioned coils responsive to variations in flux due to a deviation in concentricity of the inner and outer surface of said tubular member, and a monitoring device connected to all of said coil means for transmitting selected ones of the electrical signals generated thereby.

4. An apparatus for the electro-magnetic inspection of tubular members comprising a rack adapted to support one of said tubular members, means on said rack for rotating a tubular member supported thereon, an electrically conductive rod adapted to be inserted through said tubular member, a uni-polar generator capable of supplying a constant no ripple direct current of at least 700 amperes connected across the ends of said rod, at least two detector devices for determining variations in said magnetic field at axially spaced portions of said tubular member, means for moving said detector devices simultaneously along said tubular member during rotation thereof, each of said detector devices comprising a first coil means responsive to both broad variations in flux caused by defects on the inner surface of said tubular member and narrow variations in flux caused by defects on the outer surface of said tubular member, a second coil means responsive only to said narrow variations in flux, an eccentricity coil of the air core type larger than either of the above-mentioned coils responsive to variations in flux due to a deviation from concentricity of the inner and outer surface of said tubular member, a monitoring device connected to all of said coil means for transmitting only selected ones of the electrical signals generated thereby and recording means connected to said monitoring device for recording the occurrence and intensity of said selected signals.

5. The apparatus defined in claim 4 and including an ejector device selectively operated to remove said tubular member from said rack.

6. An apparatus for the electro magnetic inspection of tubular members comprising; a rack adapted to support one of said tubular members; means on said rack for rotating a tubular member supported thereon; an electrically conductive rod adapted to be inserted through said tubular member; a uni-polar generator, capable of supplying a constant substantially ripple free direct current of at least 700 amperes, connected across the ends of said rod; a flux responsive detector device comprising a pair of iron core coils, responsive only to narrow distortions of flux produced by flaws in the outer surface of said tubular member; a pair of air core coils responsive both to broad distortions of flux produced by flaws in the outer surface and to said narrow distortions; and a single large air core coil responsive to distortions in flux caused by eccentricity between said inner and outer surfaces; and means for imparting relative longitudinal movement between said detector device and said tubular member during rotation.

References Cited in the file of this patent
UNITED STATES PATENTS

| | | |
|---|---|---|
| 2,563,254 | Lewis | Aug. 7, 1951 |
| 2,881,387 | Wood | Apr. 7, 1959 |